UNITED STATES PATENT OFFICE.

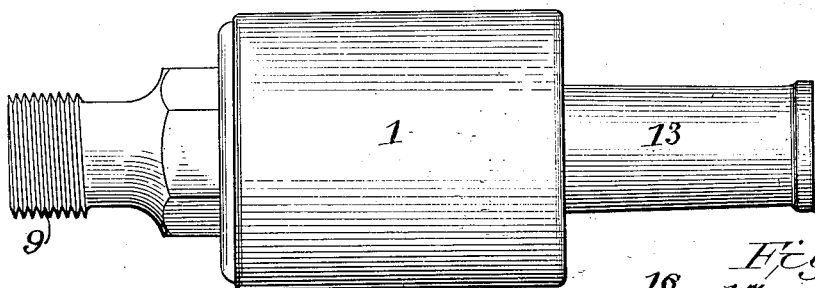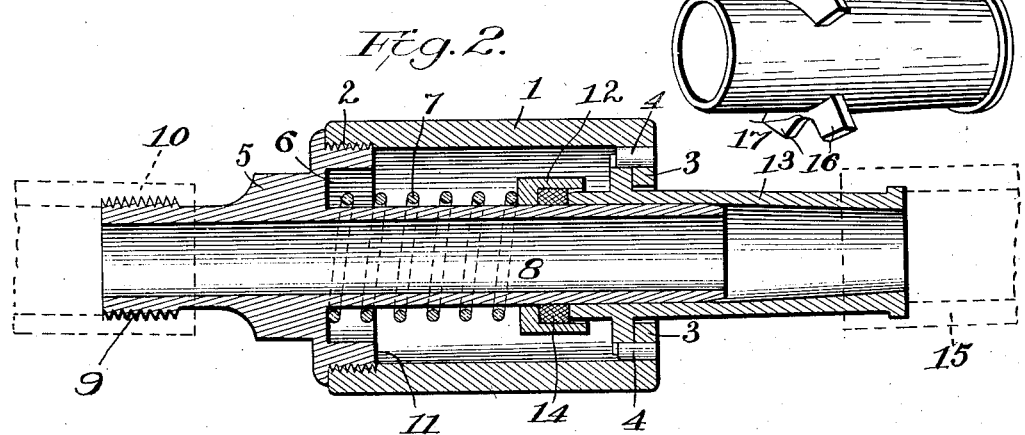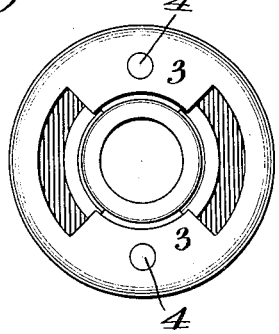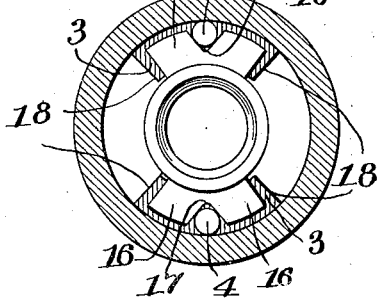

LINCON SHIRMAN DISMUTH, OF CINCINNATI, OHIO, ASSIGNOR OF ONE-HALF TO WILLIAM THOMAS FREY, OF CINCINNATI, OHIO.

PIPE OR HOSE COUPLING.

No. 912,233.  Specification of Letters Patent.  Patented Feb. 9, 1909.

Application filed June 6, 1908. Serial No. 437,143.

*To all whom it may concern:*

Be it known that I, LINCON SHIRMAN DISMUTH, a citizen of the United States, residing at Cincinnati, in the county of Hamilton and State of Ohio, have invented certain new and useful Improvements in Pipe or Hose Couplings, of which the following is a specification, reference being had therein to the accompanying drawing.

This invention relates to a pipe or hose coupling, and has for its object, the construction of a peculiar device for facilitating the attachment of a nozzle to the body portion or for the attachment of two pieces of pipe or hose, together for making a tight and secure joint.

Another object of the invention is the construction of a comparatively simple and inexpensive device for coupling pipe-sections or pipes or hose together, in a comparatively short time, and in constructing the device, I have employed very few parts of such structure as to make the device a very simple and inexpensive coupling.

With these and other objects in view, the invention consists of certain novel constructions, combinations, and arrangements of parts, as will be hereinafter fully described and claimed.

In the drawings: Figure 1 is a view, in side elevation, of my coupling. Fig. 2 is a longitudinal sectional view of my coupling. Fig. 3 is a perspective view of the detachable section or nozzle. Fig. 4 is an end view of the primary casing. Fig. 5 is a transverse, sectional view of the primary casing looking at one end, and showing the inner end of the nozzle or detachable section.

Referring to the drawings by numerals, 1 designates, preferably, a cylindrical primary casing, which is provided at one end with an internal threaded portion 2 and at its opposite end with a pair of oppositely positioned, inwardly-extending segments or lugs 3; each lug is provided, preferably, near its center with an inwardly-extending pin or stop 4. The pin or stop 4 extends beyond the inner wall of the inwardly-extending lug 3.

The inner casing or male member 5 is provided, at 6, with an annular pocket or socket, in which extends one end of the coil spring 7; the spring 7 being mounted upon the hollow body 8 of the hollow section or male member 5. The inner, hollow section or member 5 is preferably, threaded, at 9, upon its outer end, for receiving either an ordinary screw-threaded collar or pipe, as indicated, by dotted lines 10, or an ordinary rubber pipe may be placed upon the threaded end, and fastened thereto for connecting the same to the coupler. The annular portion 11 of the inner member 5 is screw-threaded upon its outer face for permitting the same to be fitted into the threaded portion 2 of the primary casing 1. The hollow portion 8 of the inner section or member 5, preferably, extends beyond the opposite end of the primary casing to that provided with the screw-threads, when the inner member 5 and the primary casing are assembled, as shown in Figs. 1 and 2.

Slidably mounted upon the hollow body portion 8 of the inner, detachable section, is a sleeve 12, which is partly closed at its inner end and open at its outer end for receiving the inner end of the detachable section or nozzle 13. Positioned between the inner end of the nozzle 13 and the inner end of the sleeve 12, is a suitable, yieldable packing 14, which may be formed of rubber or any other material for producing a tight joint; the spring 7 normally exerts a powerful pressure against the inner or rear end of the substantially-cup-shaped sleeve 12, and, therefore, forces the packing tight against the inner end of the nozzle, when said nozzle is positioned within the primary casing 1, as shown in Fig. 2.

Of course, it is to be understood that I do not necessarily limit my invention to a nozzle, for the nozzle constitutes a detachable section, whereby any other pipe or hose, as indicated by dotted lines 15, may be assembled with the outer end of the nozzle, for connecting two sections of pipe or hose, indicated by said dotted lines 10 and 15 together, although, of course, it will be obvious that my device provides simple means for attaching nozzles to the casing 1, as is sometimes necessary.

The hollow detachable section 13 is provided at opposite sides with pairs of laterally-extending lugs 16, which are formed by means of a slit or bifurcated portion 17, partly separating the lugs 16; therefore, it will be seen that the lugs 16 are formed by a bifurcated piece, preferably, upon diametrically opposite portions of the nozzle or detachable section.

To attach the detachable section or nozzle 13, it will be necessary to insert the inner end thereof into the casing 1 over the body portion 8 of the inner hollow section 5, and the bifurcated portions of lugs 16 are passed between ends 18 of the inwardly-extending lugs or extensions 3, and then causing the inner end of the nozzle 13 to engage the packing and depress the spring 7 until the lugs 16 are far enough within the casing 1 to be rotated for permitting the pins or inwardly-extending stops 16 to be positioned in the bifurcated portion or socket 17, for securely fastening the nozzle or section against accidental displacement. To remove the section or nozzle, the operator will have to press inward upon the nozzle or hollow section sufficiently to remove the pins or stops from within the bifurcated portion, and thereby permit the lugs to be rotated, until they register with the open spaces between the ends of the inwardly-extending segments or lugs 3, whereupon the hollow section 13 can be quickly detached from the casing.

It will be noted that I have provided a very efficient and simple fastening device for the detachable section, for it will be impossible to accidentally remove the nozzle or hollow section by any foreign object coming in direct contact with the fixed stops or inwardly-extending pins 4, as would be the case with a bayonet joint structure, or a device having a pin or lug mounted upon the detachable section and exposed to view, or which may be engaged from the outside.

My device may be used as a nozzle coupler, or for attaching sections or hose or pipes together, as hereinbefore specifically described.

What I claim is:

1. In a device of the character described, the combination of a primary casing, an inner, hollow casing positioned in said primary casing, said primary casing provided with inwardly-extending segments, each segment provided with a stop extending longitudinally of the casing, a detachable section provided with laterally-extending bifurcated portion, mounted upon the inner section, the stops positioned in the bifurcated portions, and means exerting pressure upon said detachable section for preventing accidental displacement of its bifurcated portions from engagement with the stops.

2. In a device of the character described, the combination of a cylindrical primary casing, provided at one end with internal screw-threads and at its opposite end with a pair of inwardly-extending segments, each segment provided with a stop extending beyond its inner face and extending longitudinally of the primary casing, an inner section provided with an annular threaded portion, the threaded portion engaging the threaded end of said casing, said inner member provided with a hollow body extending beyond one end of said casing, a detachable member slidably mounted upon the extended end of said body, said detachable member provided with a pair of laterally-extending bifurcated portions producing lugs spaced apart at their upper ends, the stops normally positioned in the bifurcated portions of said extensions, a slidable sleeve mounted upon the hollow body, a packing in said sleeve and engaging the inner ends of said detachable member, a spring positioned at one end within the annular threaded portion of the section and having its opposite end bearing against the inner end of the sleeve for holding the packing tightly against the inner end of the detachable member.

3. In a device of the character described, the combination with a primary casing, provided at one end with inwardly extending segments, each segment provided with a longitudinally extending stop, said primary casing provided with a hollow body extending beyond one end of said casing, a detachable member slidably mounted upon said extending end of said body, said detachable member provided with a pair of laterally extending bifurcated portions producing lugs, said longitudinally extending stops normally positioned in the bifurcated portions of said extensions, a slidable substantially cup-shaped sleeve mounted upon the hollow body, a yieldable packing positioned in said cup-shaped sleeve and engaging the inner end of said detachable sections, and means positioned in said primary casing and having one end bearing against one end of said cup-shaped sleeve for normally holding the packing tightly against the end of the detachable member.

In testimony whereof I hereunto affix my signature in presence of two witnesses.

LINCON SHIRMAN DISMUTH.

Witnesses:
    ELMER E. ANDERSON,
    HENRY BOUTTON.